March 5, 1968

A. S. NORCROSS 3,371,522

APPARATUS FOR MEASURING VISCOSITY

Filed June 4, 1965

INVENTOR.
Austin S. Norcross
BY
Roberts, Cushman & Jrover,
ATT'YS.

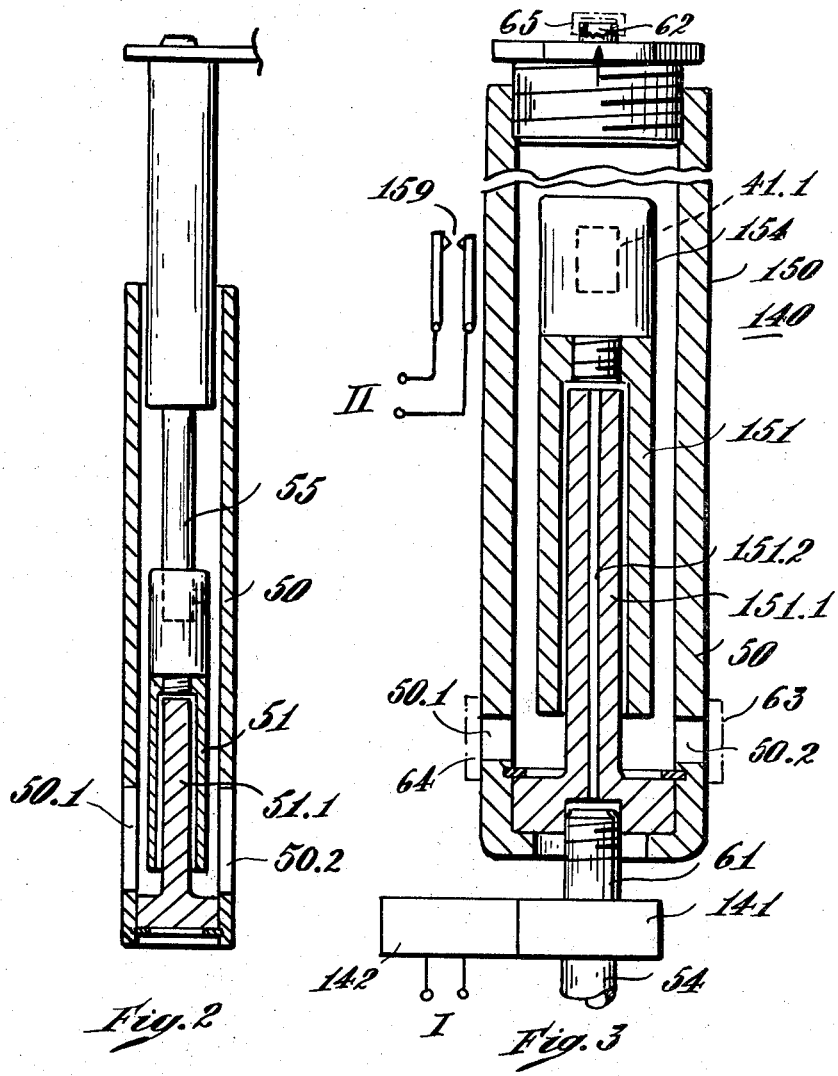

United States Patent Office 3,371,522
Patented Mar. 5, 1968

3,371,522
APPARATUS FOR MEASURING VISCOSITY
Austin S. Norcross, Newton, Mass., assignor to Norcross Corporation, Newton, Mass., a corporation of Massachusetts
Filed June 4, 1965, Ser. No. 461,280
7 Claims. (Cl. 73—57)

ABSTRACT OF THE DISCLOSURE

In a viscometer of the type wherein a cylinder and a piston form a gap and relative movement of cylinder and piston measures viscosity by the shearing of the fluid being tested, cylinder and piston are contained in a vessel for the fluid and the cylinder is moved over the fixed piston. The time needed by the cylinder to traverse a given stroke length is a measure of viscosity during respective strokes. The viscometer is particularly useful for continuous measurement when cyclically actuated within fluid continuously or periodically changed in the vessel.

---

The field of this invention is that of measurement of the viscosity of fluids by forcing the fluid whose viscosity is to be measured through a restricted orifice by a moving body. The duration of a predetermined movement of the body in the fluid is used as a measure of the viscosity, suitable indicating means being responsive to such duration of movement of the body.

Viscosity measuring devices of this general class are described in my copending applications Ser. Nos. 344,892 and 344,893 of Feb. 14, 1964, now Patent Nos. 3,304,-765 of Feb. 21, 1967 and 3,290,923 of Dec. 13, 1966, respectively, and in my Patent No. 2,491,389 of Dec. 13, 1949.

The apparatus of the present invention is particularly applicable to the measurement of viscosity of fluids which are mixtures of liquid and solid components, such as are referred to as suspensions, slurries, dispersions, or colloidals.

Objects of this invention are to prevent the accumulation of solid particles which may separate or settle out from the fluid undergoing measurement, and to avoid erroneous readings and maintenance difficulties occasioned by accumulation of such particles.

The substance of the invention can be briefly summarized as involving use of body hollow in shape and movable over a cooperating body which extends within an open end of the movable body, these two bodies together forming between them a measuring orifice through which fluid is forced from the interior of the hollow moving body during the measuring stroke of the latter.

These and other objects, advantages and inventive aspects of the invention will appear from the following description of its principles, mode of operation and of practical embodiments thereof.

The description refers to drawings in which:

FIG. 2 is a vertical sectional view showing in greater detail a mechanically restored moving body means according to FIG. 1, together with associated parts, for use in the system of FIG. 1.

FIG. 3 is a vertical sectional view of a modification of FIGS. 1 and 2 showing a fluid restored moving body means, together with associated parts, for use in the system of FIG. 1.

FIG. 4 is a cycle of operation chart indicating the operation of the components of apparatus of the system of FIG. 1.

Figure 1:
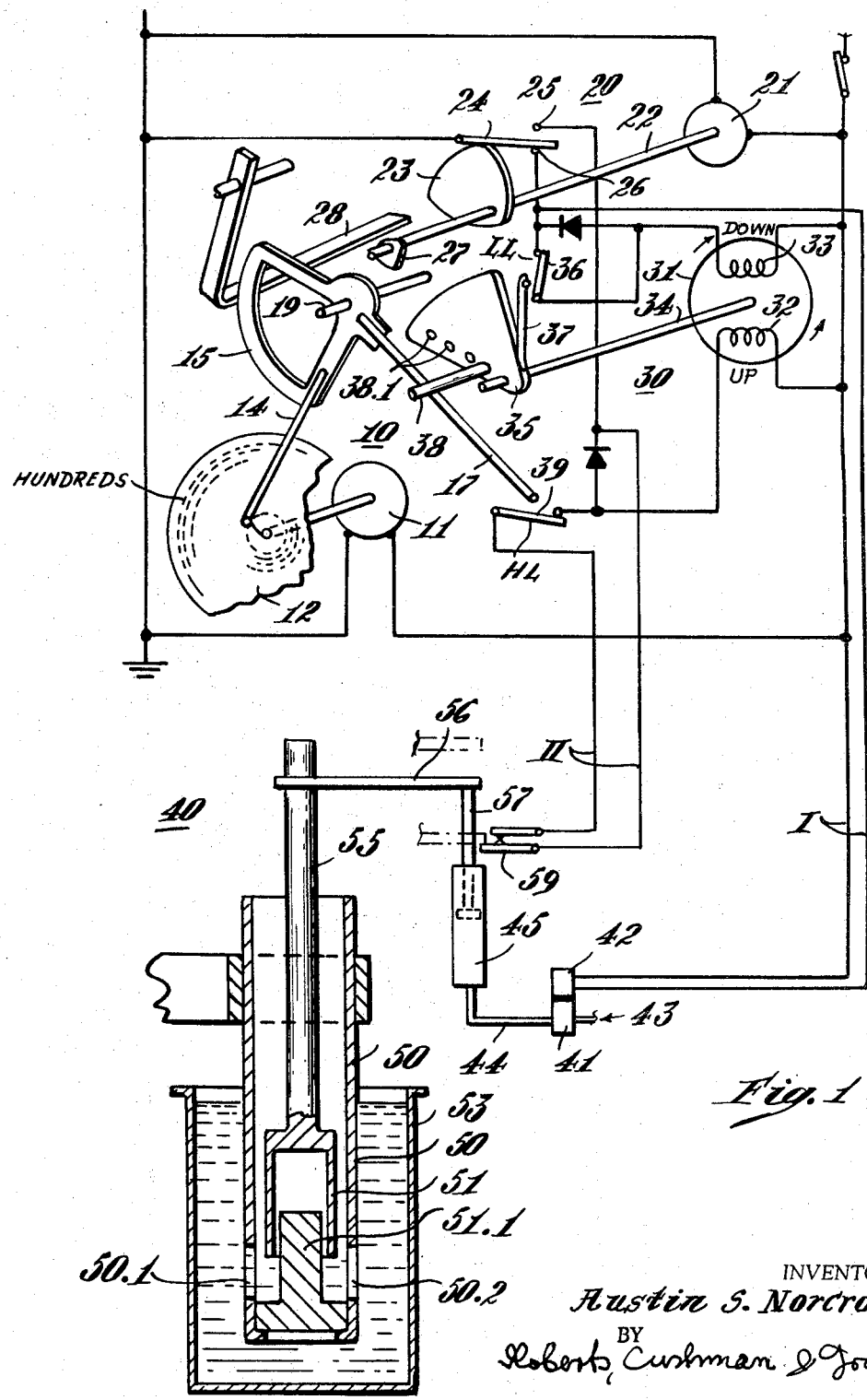
FIG. 1 is a schematical representation of a viscometer apparatus having numerous points of similarity to the systems disclosed in my said copending applications and embodying apparatus according to the present invention.

The system shown in FIG. 1 has an indicating component occupying generally the upper part of this figure, joined by circuitry links I and II to a detecting component occupying generally the lower part of this figure. While the indicating unit and the linkage are described in my said copending applications, a brief description of these should be helpful to an understanding of the way in which the detecting or measuring component is controlled and the duration of a predetermined travel of its moving body is translated into an indication or record of the viscosity of the liquid.

The indicating component or station has a chart unit 10 with a motor 11 for driving a chart 12 of conventional circular configuration. The indicator means proper comprise here a recording pen 14, mounted on a clutch and brake segment 15 which is rotatably mounted on a fixed shaft 19. The segment 15 also has attached thereto a pen actuating following 17 which is also capable of opening normally closed full scale limit switch 39, herein also referred to as high limit switch.

A timer unit 20 has a timer motor 21 conveniently supplied from the same power line as the chart motor 11 and driving, by means of shaft 22, a cam 23 arranged to tranfer during a predetermined period, beginning with a given angular position thereof, the contact or switch arm 24 from normally closed position on contact 26 to operating position on contact 25. The shaft 22 also carries a clutch operating cam or similar instrumentality indicated at 27 capable of lifting in a predetermined angular position at the end of each measuring cycle, the brake and clutch arm 28 from the segment 15, for the purpose of momentarily releasing the clutch to allow the pen to return, by gravity, spring or other biasing, to a lower position unless it is held by the pin 38, as will be described below.

A measuring unit 30 has a measuring motor 31 of the type which can be selectively operated in either direction by means of separate windings here designated as up-winding 32 and as down-winding 33. The motor 31 drives a shaft 34 which carries a range selector plate 35 with a switch operator 37 which in a given angular position of the plate opens a normally closed low limit switch 36, in the circuit of the down-winding 33 in series with the normally closed contacts 24, 26. An actuator pin 38 for operating the above-mentioned follower 17 can be placed in various range selecting positions upon the range selector plate 35, as indicated by perforations 38.1 for placing the pin 38 at various radii from the shaft 34 to move the follower 17 at preselected speeds. As indicated in FIG. 1, the switches which control the windings of motor 31 are bridged by rectifiers in well-known manner to stop this motor quickly by energizing the corresponding winding with direct current. The measuring motor 31 is capable of lifting the pen 14 by way of the pin 38, against the frictional torque applied by the brake and clutch arm 28 to the segment 15. This frictional torque between segment 15 and arm 28, while it can be overcome by the torque exerted by the measuring motor, is capable of holding the pen in viscosity indicating position, until the next measurement lowers or raises its reading, as will be described below. The so-called high limit switch 39 stops the measuring motor by energizing the up-coil 32 with direct current, when the pen has reached full scale such as "hundred" reading, in order to prevent overrunning. It should be understood that the designations "up-coil" and "down-coil" for 32, 33, respectively, refer to gravity biasing of plate 35 and segment 15, and hence to up and down movement of the pen.

The up and down movement of the moving body of the detecting component will now be briefly explained, so that its correlation with the system can be understood.

The detecting component or station 40 shown in the lower part of FIGS. 1 and 2 has a fluid receiving vessel 50 containing a moving body member indicated generally at 51. Fuid samples whose viscosity is to be measured can be supplied to the vessel 50 by any convenient means such as indicated by the container 53 from which fluid is admitted into and removed from the vessel 50 through openings 50.1, 50.2 in vessel 50. The lifter rod 55, for the moving body, appropriately guided, has near its top a lifting and switch operating head 56 by means of which the rod can be lifted by way of a push rod 57 which is part of a pneumatic gear of conventional construction comprising a solenoid valve 41 operated by a magnet 42, an air supply 43 and an air duct 44 leading to the lifter rod operating air cylinder 45. A normally closed circuit breaker 59 serving as a measuring switch, is arranged adjacent to head 56 which opens it upon descending. When air is supplied during energization of solenoid valve 41, 42, the lifter rod is raised to a predetermined height. Upon reverse operation of the pneumatic control system, the push rod 57 drops quickly allowing the lifter rod and moving body 51 to fall by gravity until the head 56 opens switch 59 terminating the period of energization of coil 32 which period corresponds to the falling time of the moving body which is a measure of viscosity, by means of the gap between the body 51 and the piston or mandrel 51.1.

Another embodiment of the detecting station, involving somewhat modified circuitry elements which however fit the linking circuitry without modification thereof, will now be described with reference to FIG. 3. A practical embodiment of a detecting component of this type is fully described in my Patent No. 3,304,765. In FIG. 3, numeral 150 designates a container having a fluid supply port 61 at the bottom and containing a measuring body or cylinder 151 carrying an actuating magnet 41.1 in a magnet carrier 154 of non-magnetic material. The supply port is adjacent to a body lifting control valve 141. Upon opening of this control valve, actuated by solenoid 142 in linkage II, fluid whose viscosity is to be measured is admitted from duct 54 and lifts the cylinder 151 until the valve is again fully or partly closed by operation of the indicating component and the linking circuitry as will be described below. Upon descending, the magnet 41.1 opens a circuit breaker such as the normally closed proximity switch 159. It will be noted that the body 151 is freely lifted by the fluid to be measured, through which it descends during a following part of the cycle for purposes of viscosity measuring in terms of the duration of the descending period from the highest position of the body until the magnet reaches the said proximity switch 159.

As more fully described in my Patent No. 3,304,765, continuous flow at station 140 can be maintained by slowing down the fluid during the measuring periods of the cycles when the body is forced through the fluid by a biasing force such as gravity. Continuous flow measuring can also be carried out with a detecting station as shown at 40.

The system operation is comprehensively set forth in FIG. 4 and needs little further explanation beyond the following comments pertaining particularly to the circuitry.

Assuming that the apparatus is in the condition at the beginning of the period charted in FIG. 4, the body cycling means which includes motors 21 and 31 with the switches pertaining thereto, causes the moving body 51 or 151 to rise and the measuring motor 31 with plate 35 to return to initial position, with valve 41 or 141 held open by 42 or 142 and the contacts 24, 26 closed. When the timing means 20 transfers contact 24 to 25, the body falling period begins, initiated through linkage conduits I de-energizing solenoid magnet 42 or 142 thereby closing valve 41 to the air supply and venting cylinder 45 or partly or wholly closing valve 141. The up-winding controlled measuring motor 31 rotates pin 38 downwardly progressively increasing the indication made by the pen 14, until the moving body 51 or 151 reaches a predetermined lower position, where the operating head 56 opens the measuring switch 59 or the magnet 41.1 opens the switch 159 and by way of electric link II the motor 31 is stopped.

Assuming first that the preceding viscosity measurement was lower, the pin 38 abuts, during the measuring period while motor 31 is running, the follower 17 which in turn rotates the segment 15 with pen 14. As indicated above, the driving torque of the segment 15 overcomes the frictional torque applied by the brake arm 28 and the pen 14 advances on the chart to the value corresponding to the viscosity of the sample just having been measured. Assuming on the other hand that the preceding viscosity measurement was higher and the pin 38 has not advanced as far as during the preceding cycle, the segment 15 is permitted to rotate towards a lower reading of the pen at the end of the measuring cycle when cam 27 momentarily releases the brake arm 28, as described above. It will now be evident that this lower reading is determined by the position of pin 38 at the time when the measuring motor is topped by the opening of link II at the end of the measuring period. The low limit switch 36 opens at the end of the down movement of motor 31, stopping plate 35 in a position corresponding to zero indication of the pen if it were fully released. This is the setting for normal operation, but for purposes of measuring with a so-called "suppressed zero," the position of plate 35 can be changed to permit the motor to go below the zero reading. The high limit switch 39 opens when the pen is in upper-most, full scale position.

Whereas the moving body of my above referred to patent is a piston which provides a measuring orifice between its outer surface and the inner surface of the fluid-containing vessel, the moving body of the present invention is a hollow body or cylinder 51 or 151 adapted to move over and envelope a cooperating mandrel or piston 51.1 or 151.1, defining a measuring orifice therewith. The difference is important in preventing accumulation in the bottom of the vessel of particles which may settle out of the fluid.

In FIGS. 1 and 2 the cooperating mandrel, indicated at 51.1 extends up from the bottom of the vessel 50, preferably integral with the bottom end thereof. Ports 50.1 and 50.2 interconnecting the interior of the vessel 50 and the surrounding vessel 53 serve not only to admit fluid to the vessel 50 on the upstroke of the body 51 but also, on the down-stroke, serve as discharge passages for the expulsion of any settled-out particles. Accumulation of such particles on the bottom of the vessel 50 is thereby avoided.

These ports 50.1 and 50.2 can be located close to the bottom of the vessel 50, i.e., in the region of the bottom of the stroke of the body 51, without interferring with the restricted orifice effect because through use of the hollow moving body principle, these ports, so located, do not relieve the fluid from being forced through the restricted orifice defined by the inner surface of the hollow body and outer surface of the mandrel. The fluid to be forced through the restricted orifice is most of that body of fluid which finds itself trapped in the space above the mandrel and within the hollow body 51, when the body is at its highest level, exposing most but not quite all of the mandrel. This fluid can escape only by going through the restricted orifice between body and mandrel as the body lowers.

For this space above the mandrel to receive proper charging of fluid in the device of FIGS. 1 and 2, the hollow body 51 should extend into the fluid at all levels attained by the hollow body.

In connection with the embodiment of FIG. 3 it has been mentioned above that the moving body can be lifted by the flow of fluid. To this end, the mandrel or piston 151.1 is provided with a central bore or duct 151.2 communicating with the fluid intake line 61 and with the interior of the hollow body 151.

Again, as in the device of FIGS. 1 and 2, the ports 50.1 and 50.2 of FIG. 3 are for vertical operation near the bottom of the vessel and in the region of the lowest level of the hollow moving body and serve as exits for any settled-out particles. It will be evident that the function of the lifting solneoid 142 in linkage I of FIG. 3 is the context of the complete system with reference to FIG. 1. While this mode of operation is preferred if sediment problem is present, continuous operaton is often preferred. In that case, cap 65 is removed from nipple 62 and connected to an exit duct, while ports 50.1 and 50.2 are closed with covers 63, 64, the alternative use being indicated by dot and dash lines.

While the operation of the device in expelling settled-out solid particles can best be visualized by regarding the moving body as having a vertical movement in a vertically disposed cylindrical vessel as indicated in FIG. 1, it will be understood that a similar effect is obtainable if the body is moved horizontally in a horizontally disposed cylindrical vessel by suitable motor means as in my application Ser. No. 461,278, filed concurrently herewith for Viscosity Measuring Apparatus, at least one of the ports 50.1, 50.2 then being located at the lowest part of the vessel to allow solid particles to fall out.

Another advantage of the moving cylinder system according to the invention concerns gap adjustment, as follows. The detecting gap is usually slightly tapered and for most practical purposes this taper has to be on the inner body, herein also referred to as piston or mandrel. It is sometimes desirable to change the gap of a given detector unit according to requirements at hand, and if, as in conventional apparatus of this type, the cylinder is fixed with the tapered piston moving therein, the latter has to be exchanged for adjusting the gap, because the cylinder cannot easily be taken from the rigid detector assembly. On the other hand, in accordance with the invention where a stationary mandrel is within a moving cylinder, the tapered fixed mandrel can be retained and only the cylindrical outer body exchanged which is less expensive since the machining of cylindrical bores is easier than that of exact tapers.

It should be understood that the present disclosure is for the purpose of illustration only and that this invention includes all modifications and equivalents which fall within the scope of the appended claims.

I claim:

1. Viscosity measuring apparatus of the type wherein a body moves against and dependent upon resistance offered by a fluid to be measured, and wherein time responsive means are responsive to duration of said movement, comprising:
   a hollow body having an open end and arranged to move in the fluid during said duration of movement;
   a cooperating inner body extending within said hollow body through said open end of the hollow body, the two said bodies together forming between them a measuring orifice through which fluid is forced from the interior of the hollow body as the latter moves over the inner body; and
   a vessel for receiving the fluid and containing said hollow body and said inner body.

2. Apparatus according to claim 1 including means for periodically moving the hollow body in a direction toward exposing the inner body, increasing the space unoccupied by the inner body within the hollow body.

3. Apparatus according to claim 2 in which said moving means includes a duct leading through said inner body for the supply of fluid whose viscosity is to be measured, to the interior of the hollow body.

4. Apparatus according to claim 3 further including a housing for said two bodies and for said fluid and having an entrance port and opposite thereto a discharge port, the inner body being fixed to the housing near said two ports.

5. Apparatus according to claim 3 further including a housing for said two bodies and for said fluid and having an entrance port leading into said duct, and said housing having a discharge port opposite the end of said duct.

6. Viscosity measuring apparatus comprising:
   a vessel adapted to receive fluid whose viscosity is to be measured;
   a hollow body having an open end and arranged to move in the fluid in said vessel during the measurement; and
   a cooperating inner body extending within said open end of the hollow body;
   the two said bodies together forming between them a measuring orifice through which fluid is forced from the interior of the hollow body as the latter moves over the inner body toward one end of the vessel, and the vessel having a lateral discharge port adjacent to its said end for expulsion from the vessel of particles settling out of the fluid.

7. Apparatus for measuring the viscosity of fluid by the duration of a predetermined movement of a body in a fluid, comprising:
   a hollow body having an open end;
   a cooperating body extending within said hollow body through the open end of the hollow body;
   a vessel for receiving the fluid and containing said hollow body and said cooperating body; and
   means for moving the hollow body relatively to the fluid and the cooperating body, the two bodies together forming between them a measuring orifice through which fluid is forced from the interior of the hollow moving body as the latter moves over the cooperating body.

References Cited

UNITED STATES PATENTS

| | | | |
|---|---|---|---|
| 1,270,800 | 7/1918 | Edgecomb | 73—54 |
| 2,209,755 | 7/1940 | Beale | 73—57 |
| 2,491,389 | 12/1949 | Norcross | 73—57 |
| 2,503,660 | 4/1950 | Exline et al. | 73—56 |

DAVID SCHONBERG, *Primary Examiner*.